United States Patent [19]

Faccia

[11] Patent Number: 5,154,510
[45] Date of Patent: Oct. 13, 1992

[54] DISCHARGE OUTLET FOR FIBROUS PRODUCT MIXERS

[76] Inventor: Tiziano Faccia, Via Padova 102, 35026 Conselve, Italy

[21] Appl. No.: 645,994

[22] Filed: Jan. 23, 1991

[30] Foreign Application Priority Data

Jan. 25, 1990 [IT] Italy .................. 41505 A/90

[51] Int. Cl.⁵ .................. B01F 7/16; B01F 15/02
[52] U.S. Cl. .................. 366/193; 366/196
[58] Field of Search ............... 366/186, 189, 192, 193, 366/194, 195, 196, 603, 42, 46, 52; 222/559, 561; 49/404; 296/50, 52

[56] References Cited

U.S. PATENT DOCUMENTS

| 655,967 | 8/1900 | Felton | 222/561 |
|---|---|---|---|
| 2,696,977 | 12/1954 | Baldridge | 366/603 |
| 3,318,486 | 5/1967 | Felix | 222/559 |
| 3,954,210 | 5/1976 | Lascombe | 222/561 |
| 3,995,836 | 12/1976 | Carter | 366/192 |
| 4,037,827 | 7/1977 | Davison | 259/37 |
| 4,480,927 | 11/1984 | Peat | 366/603 |
| 4,707,140 | 11/1987 | Mohrlang | 366/603 |
| 4,756,626 | 7/1988 | Neier | 366/603 |
| 4,838,598 | 6/1989 | Hyde | 222/561 |

FOREIGN PATENT DOCUMENTS

| 2299905 | 3/1976 | France . |
| 2604866 | 4/1988 | France . |
| 23695 | of 1914 | United Kingdom . |

Primary Examiner—Philip R. Coe
Assistant Examiner—Randall Edward Chin
Attorney, Agent, or Firm—Guido Modiano; Albert Josif

[57] ABSTRACT

The discharge outlet is for use with fibrous product mixers of the type which comprise, in a lower region of a lateral wall of a mixing container, a wide opening or discharge outlet at which a movable closure panel is associated. The panel is shaped substantially complementarily to the opening. The discharge outlet has a metal plate flap welded longitudinally to the lower region defined by the base of the container.

2 Claims, 1 Drawing Sheet

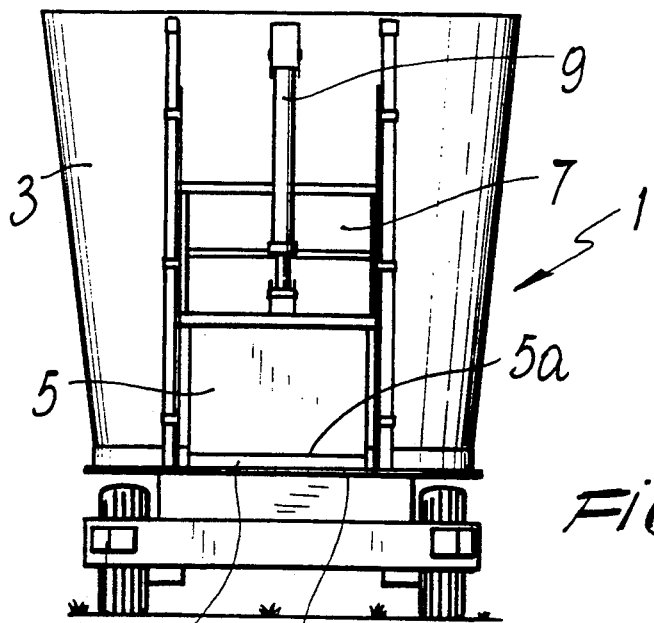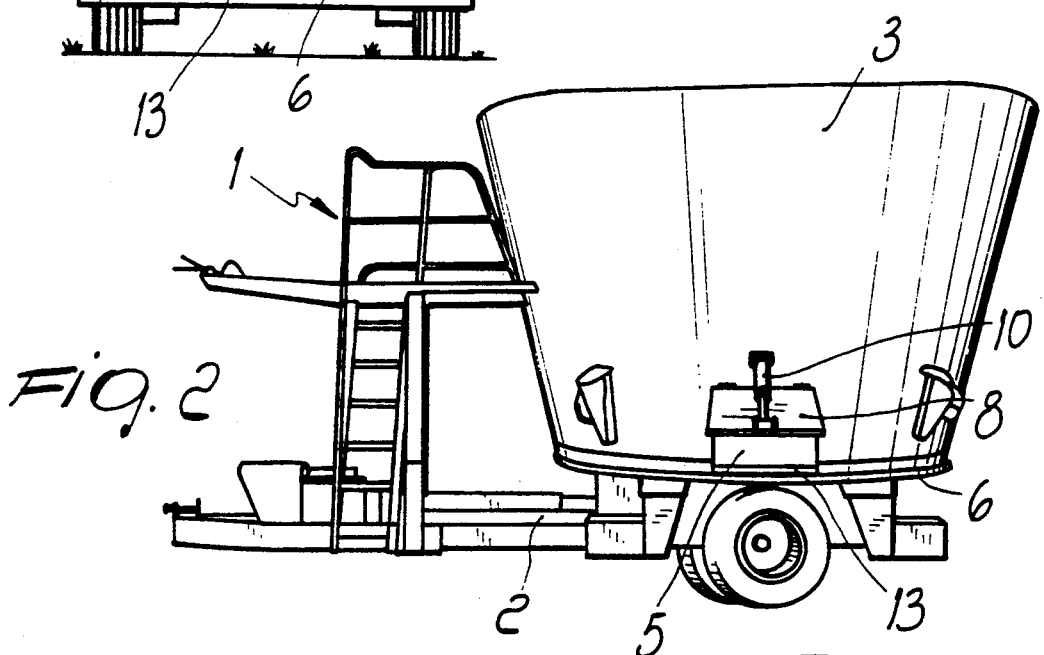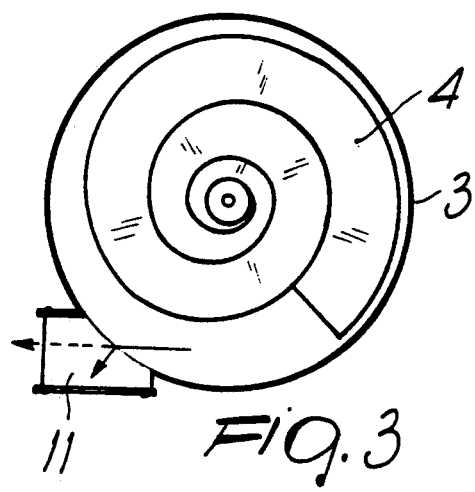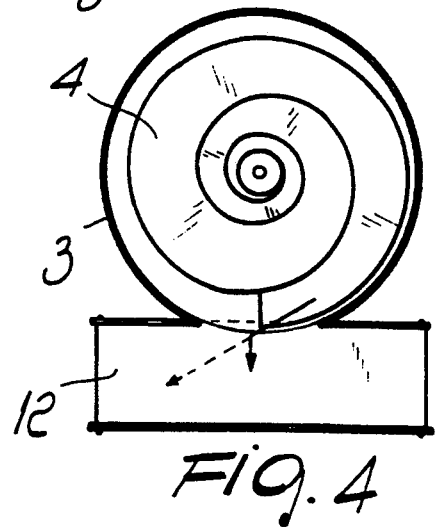

DISCHARGE OUTLET FOR FIBROUS PRODUCT MIXERS

BACKGROUND OF THE INVENTION

The present invention relates to a discharge outlet for fibrous product mixers.

Devices for mixing forage with farm and industry by-products (for example molasses), with mineral protein integrators and/or with concentrates such as flours, mashes, pulps etc., are currently used in the field of zootechnics.

Two types of mixers are known, mixers with a vertical mixing action and mixers with a horizontal mixing action.

The vertical type of mixer, in particular, comprises a substantially inverted frustum-like container, wherein one or more vertical worm screws are provided. Each worm screw is substantially composed of a metallic strip wrapped in a spiral around a central shaft.

The spiral has a substantially conical arrangement, since the width of its strip decreases gradually from the bottom upward.

A discharge outlet with a movable closing panel is present on the lateral wall of the container, in a lower region thereof for unloading mixed products.

One or more conveyor belts with single or bilateral outlets are arranged below the discharge outlet.

Although said discharge outlet is valid from a practical point of view, it has been found to be susceptible to improvements.

In particular, it has been observed that parts of floury components tend to escape first, without being mixed together with the rest of the products, when the panel is opened.

Furthermore, it foreign bodies such as pieces of iron or others end up inside the container together with the products being mixed, the fact may occur that said pieces, since they have a higher relative density, become deposited on the bottom of the container and interpose themselves between the outlet and the worm screw during discharge, jamming said worm screw and causing damage to its motor system.

Finally, both when the container is coupled to unloading conveyor belts and when discharge occurs directly through the outlet, the mixed products are expelled in a disorderly manner or, due to the rotation of the worm screw, at an excessive speed.

SUMMARY OF THE INVENTION

The aim of the present invention is to provide an improved discharge outlet for mixers of fibrous products which, by virtue of its peculiar constructive characteristics, is capable of ensuring high efficiency during the product unloading step.

A consequent primary object of the invention is to provide an improved discharge outlet which eliminates the dangers of breakage due to the presence of foreign bodies inside the mixing container.

A further object of the invention is to provide an improved discharge outlet which can be combined both with tanks currently in use and with those to be manufactured.

This aim, these objects and others which will become apparent hereinafter are achieved by an improved discharge outlet for mixers of fibrous products, of the type which comprises a wide quadrangular opening arranged in the lower region of the lateral wall of the mixing container, a movable closure panel being associated with the container at said opening and being substantially shaped complementarily thereto, said discharge outlet being characterized in that a flap is connected longitudinally to a lower side defined by the base of the container.

BRIEF DESCRIPTION OF THE DRAWINGS

Further characteristics and advantages of the invention will become apparent from the detailed description of an embodiment thereof, illustrated only by way of nonlimitative example in the accompanying drawings, wherein:

FIG. 1 is a rear view of a first type of mixing truck for fibrous products provided with the improved discharge outlet according to the invention and not equipped with an unloading conveyor belt;

FIG. 2 is a lateral perspective view of a second type of mixing truck provided with the discharge outlet according to the invention and not equipped with an unloading conveyor belt;

FIG. 3 is a schematic top plan view of a mixer with a single unloading conveyor belt, wherein the broken arrow indicates the direction of product unloading with current outlets and the solid arrow indicates the unloading direction with the improved outlet according to the invention;

FIG. 4 is a schematic top plan view of a mixer with a conveyor belt with bilateral unloading, wherein the broken arrow indicates the direction of product unloading with current discharge outlets and the solid arrow indicates the product unloading direction with the improved discharge outlet according to the invention.

DESCRIPTION OF THE PREFERRED EMBODIMENTS

With reference to the above figures, a mixing truck for fibrous products, of the type currently used in zootechnics, is generally indicated by the reference numeral 1 and comprises, on a wheeled chassis 2, a substantially inverted frustum-like mixing container 3 open at the top and inside which there is means for mixing fibrous products advantageously constituted by a worm screw or helix 4 which has vertical axis and has an outer profile arranged on an ideal conical surface.

The mixing truck 1 is conveniently loaded from above with bales of hay, straw, protein integrators and other nutritional materials which, after shredding and mixing, are unloaded into the troughs of the animals.

A discharge outlet in the form of a wide rectangular opening 5 is provided for discharge on the lower part of the vertically extending lateral wall of the container 3 and is arranged rearward or laterally as illustrated in FIGS. 1 and 2; its lower side is in practice defined by the horizontal base 6 of the container 3.

A movable closure panel is associated with the container at said opening 5, is shaped complementarily to the wall; said panel, indicated in FIGS. 1 and 2 by the reference numerals 7 and 8 respectively, can be both of the sliding type and of the tilt-down type and actuated by a corresponding hydraulic jack 9 or 10.

A conveyor belt with single outlet 11 or bilateral outlet 12 may be arranged below said opening 5.

According to the invention, a flap 13, advantageously made of metal plate is connected, e.g., welded longitudinally on the lower side defined by the base 6 of the container 3 so that the lower edge 5a of the discharge outlet is spaced upwardly from the base 6; said flap 13 is curved so as to follow the profile of the container and is arranged substantially parallel to the wall.

Said flap 13 has first of all the function of keeping inside the container 3 the small parts of floury components which normally tend to escape first when the panel 7 or 8 is opened and secondly of preventing any foreign bodies inside the container from becoming interposed between the opening 5 and the worm screw 4, jamming it and damaging its actuation elements.

In the cases of FIGS. 1 and 2, in which the mixed product is unloaded directly, without conveyor belts, the flap 13 prevents said product from being expelled from the container 3 in a disorderly and discontinuous manner.

In the case illustrated in FIG. 3, in which a single-outlet conveyor belt 11 is arranged substantially parallel to the direction of outflow of the mixed product, the flap 13 slows the expulsion of the product, which currently occurs so rapidly as to miss the unloading belt.

In practice one prevents the discharge from not being controlled by the conveyor belt and the product from falling directly into the troughs in a disorderly manner.

The same occurs in practice in the case illustrated in FIG. 4, wherein the flap 13 facilitates a substantially radial discharge of the mixed product onto the unloading conveyor belt 12 which then, according to the direction of motion, delivers it to the troughs.

The presence of the flap 13 furthermore avoids the need to resort to guards suitable for guiding the product during discharge onto the conveyor belt without spilling over it.

In practice it has thus been observed that the improved discharge outlet according to the invention has achieved the intended aim and objects.

The modifications with respect to known outlets are simple and rapid to perform, so that even those which are already in use may be appropriately modified.

The invention thus conceived is susceptible to numerous modifications and variations, all of which are within the scope of the inventive concept.

All the details may furthermore be replaced with other technically equivalent elements.

In practice, the materials employed, so long as compatible with the contingent use, as well as the dimensions, may be any according to the requirements.

I claim:

1. In combination, a fibrous product mixer and a discharge outlet, said mixer comprising a mixing container having a substantially horizontal base and a lateral wall which extends substantially vertically from said base, said mixer further comprising means for mixing products inside said mixing container which rotates around a substantially vertical axis, said discharge outlet being provided in said lateral wall of said mixing container at a lower region thereof substantially at said horizontal base, a movable closure panel for closing said outlet being provided, said discharge outlet further comprising a flap element extending upwardly from said horizontal base so that a lower edge of said discharge outlet is spaced upwardly from said horizontal base, said lateral wall defining a profile, said flap element being arranged substantially parallel to said lateral wall and substantially continuing said profile of said lateral wall.

2. The combination of claim 1, wherein said flap element is made of metal plate material and is welded to said base of said mixing container.

* * * * *